US012708865B2

(12) United States Patent
Radaelli et al.

(10) Patent No.: US 12,708,865 B2
(45) Date of Patent: Aug. 18, 2026

(54) DEVICE AND METHOD FOR COALESCENCE SEPARATION

(71) Applicant: ENI S.P.A., Rome (IT)

(72) Inventors: Enrico Radaelli, San Donato Milanese (IT); Antonio Bennardo, San Donato Milanese (IT); Loredana Caldiero, San Donato Milanese (IT)

(73) Assignee: ENI S.P.A., Rome (IT)

( * ) Notice: Subject to any disclaimer, the term of this patent is extended or adjusted under 35 U.S.C. 154(b) by 406 days.

(21) Appl. No.: 18/553,342

(22) PCT Filed: Apr. 1, 2022

(86) PCT No.: PCT/IB2022/053060
§ 371 (c)(1),
(2) Date: Sep. 29, 2023

(87) PCT Pub. No.: WO2022/208459
PCT Pub. Date: Oct. 6, 2022

(65) Prior Publication Data

US 2024/0165541 A1 May 23, 2024

(30) Foreign Application Priority Data

Apr. 1, 2021 (IT) ........................ 102021000008297

(51) Int. Cl.
*B01D 17/04* (2006.01)
*B01D 21/00* (2006.01)
*B01D 17/02* (2006.01)

(52) U.S. Cl.
CPC ........ *B01D 17/045* (2013.01); *B01D 17/0208* (2013.01); *B01D 17/0211* (2013.01); *B01D 21/0042* (2013.01); *B01D 21/0045* (2013.01)

(58) Field of Classification Search
CPC ............ B01D 17/0211; B01D 21/0045; B01D 17/045; B01D 21/2427; B01D 21/0075; B01D 19/0042; B01D 21/0042; B01D 21/0048; B01F 27/86; B01F 33/811
See application file for complete search history.

(56) References Cited

U.S. PATENT DOCUMENTS 1,701,068 A 2/1929 Flowers
3,517,487 A 6/1970 Burnham, Sr.
4,138,342 A 2/1979 Middelbeek et al.
(Continued)

FOREIGN PATENT DOCUMENTS

GB 1170691 11/1969

OTHER PUBLICATIONS

European Search Report dated Sep. 18, 2024 from corresponding European Patent Application No. 22 714 265.0, 5 pages.
(Continued)

*Primary Examiner* — Pranav N Patel
(74) *Attorney, Agent, or Firm* — Ruggiero McAllister & McMahon LLC

(57) ABSTRACT

There are a device and a method for coalescence separation for a fluid having at least two phases at least partially immiscible with each other and having different specific density or gravity. The separation device has a plurality of sheets or trays that are spaced apart from one another to form passage channels that slow down and divert the flow favouring the coalescence separation.

12 Claims, 5 Drawing Sheets

(56) References Cited

U.S. PATENT DOCUMENTS

| | | | | | |
|---|---|---|---|---|---|
| 5,068,035 | A * | 11/1991 | Mohr | B01D 17/0211 | 210/522 |
| 5,840,198 | A * | 11/1998 | Clarke | B01D 21/2422 | 210/522 |
| 2013/0292327 | A1* | 11/2013 | Andreussi | B01D 17/045 | 210/521 |

OTHER PUBLICATIONS

International Search Report dated Jun. 15, 2022 from corresponding International Patent Application No. PCT/IB2022/053060, 5 pages.
Written Opinion dated Jun. 15, 2022 from corresponding International Patent Application No. PCT/IB2022/053060, 10 pages.
Second Written Opinion dated Feb. 20, 2023 from corresponding International Patent Application No. PCT/IB2022/053060, 8 pages.
International Preliminary Report on Patentability dated May 12, 2023 from corresponding International Patent Application No. PCT/IB2022/053060, 9 pages.

* cited by examiner

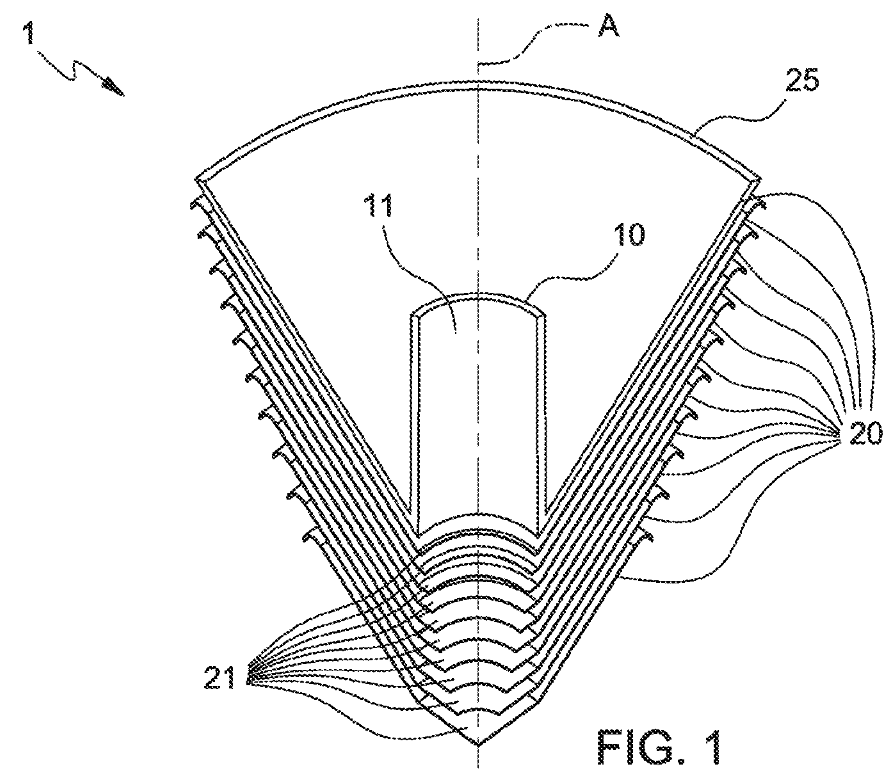
FIG. 1
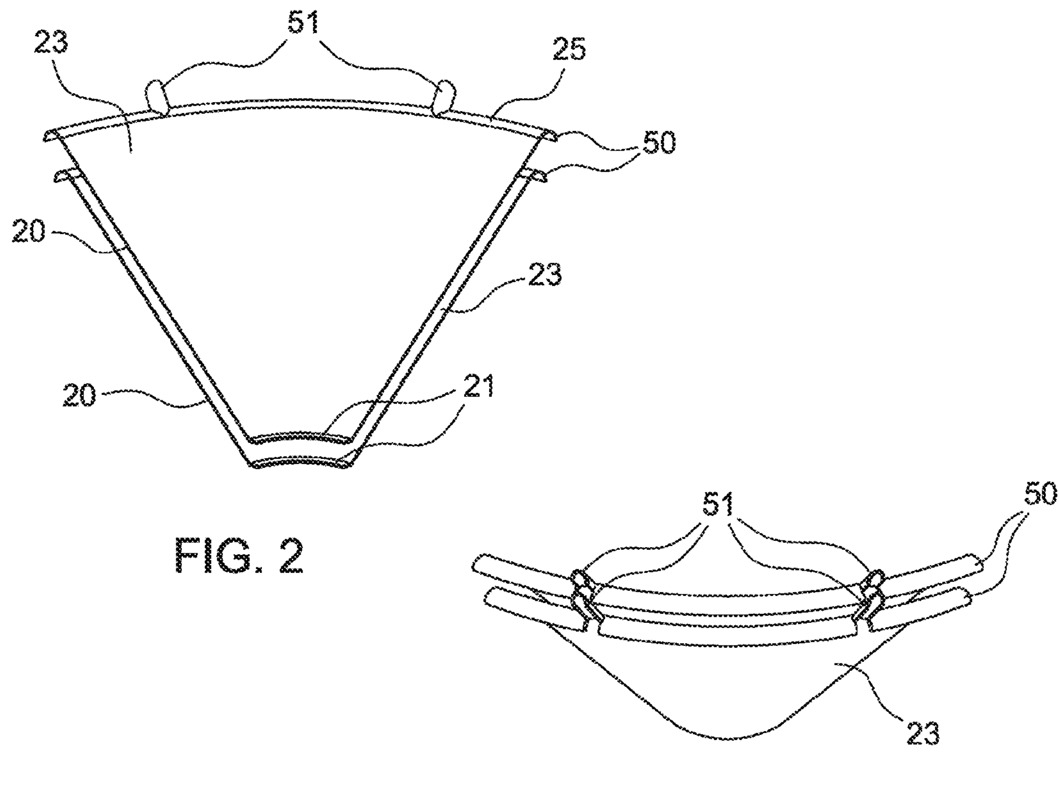
FIG. 2
FIG. 3

DEVICE AND METHOD FOR COALESCENCE SEPARATION

CROSS-REFERENCE TO RELATED APPLICATIONS

This patent application claims priority based on PCT/IB2022/053060, filed Apr. 1, 2022, which claims priority based on Italian Patent Application No. 102021000008297, filed on Apr. 1, 2021, the entire disclosures of which are incorporated herein by reference.

FIELD OF THE DISCLOSURE

The present disclosure relates to a device and a method for coalescence separation for a fluid comprising at least two phases at least partially immiscible with each other and having different specific density or gravity.

DESCRIPTION OF THE RELATED ART

The problem of the separation of two partially immiscible phases present in a fluid has been known for years and several technologies have been developed to create devices and methods that can guarantee an effective separation between the two phases present in a fluid. The problem is felt in several technological sectors such as, for example, in the oil & gas or water management business where the presence of fluids containing water and hydrocarbons or oils in general is a focus of attention. During drilling operations for the extraction of hydrocarbons, the production of contaminated water is an unavoidable intrinsic phenomenon, which must therefore be resolved in order to ensure that the extracted waters are treated in accordance with current local regulations. Contaminated waters often contain hydrocarbons, gases, suspended solids, radionuclides and other harmful chemicals. The phenomenon of water production during the extraction of hydrocarbons is significant because, until a few years ago, it represented the largest volume of liquid produced during extraction operations, reaching up to three times the volume of the hydrocarbon extracted; today, through new drilling and extraction technologies, the volume of water produced has been reduced to about twice that of the extracted hydrocarbon. It is therefore clear that the treatment and purification of these large volumes of contaminated water is an important need to which various technologies have sought to respond. For offshore installations this need becomes imperative as the constraints on the weights and overall dimensions of water treatment plants are limited and the demand for compact, lightweight and efficient devices is ever more pressing.

In particular, for the removal of oils or hydrocarbons present in water, different water management and treatment strategies are currently available such as, for example, recycling and reinjection while other systems focus on discharge and disposal. For offshore plants, for example, the disposal of produced water at sea is the most common methodology; for the discharge of oily waters at sea, strict legislative parameters must be respected in order not to create negative impacts on the ecosystem, so systems for separating oil from water become fundamental both for their effectiveness and for their overall dimensions and weight.

The technological solutions available today for the removal of oils from contaminated waters or, more generally, for the separation of two phases having different specific density or gravity present in a fluid can be classified into three groups: separation by gravity (e.g. API skimmers, hydrocyclones and separators), separation by filtration (activated carbon filters, sand filters or oleophilic, hydrophilic or hydrophobic filters), coalescence separation (devices with interwoven meshes, corrugated plates or coalescing plates).

Separation by coalescence, which is also the method underlying the present disclosure, is normally carried out with very voluminous, often horizontally extending equipment, generally coupled to hydrocyclones or gravity systems. These devices are clearly unattractive for offshore applications or for upgrading existing plants in which there is not enough space for the installation of additional voluminous devices. Other solutions for coalescence rely on plates, metal nets or coalescing cartridges arranged in series or in parallel; these solutions fail to guarantee a constant flow of the fluid with evident impacts on the efficiency of the system that often does not meet the minimum separation requirements imposed by current regulations.

All devices known in the art require frequent maintenance and have a limited lifespan over time, resulting in higher operating costs for their operation.

SUMMARY OF THE DISCLOSURE

Object of the present disclosure is to realize a device that overcomes the drawbacks of the prior art, allowing the separation of two partially immiscible phases having different specific density or gravity in a more effective way than the systems known in the art, ensuring smaller overall dimensions of the device and greater versatility of use related to the compactness and lightness of the device.

According to the present disclosure, it is provided a coalescence separation device 1 for a fluid comprising at least two phases at least partially immiscible with each other and having different specific density or gravity, the device comprising:

- a hollow cylindrical body 10 provided, at one end, with an opening 11 defining the fluid inlet;
- a plurality of axial-symmetrical geometry coalescing sheets 20 with an axis A coinciding with that of the hollow cylindrical body, each of the coalescing sheets 20 comprising a circular central plane portion 21 provided with a through opening 22 and a frusto-conical peripheral portion 23 with a major base arranged towards the opening 11 of the cylindrical body and a minor base coinciding with the periphery of the central portion 21;

the coalescing sheets 20 being arranged parallel to one another and spaced apart from one another to form passage channels 40 for the fluid, the circular central plane portion 21 of each coalescing sheet 20 being at least partially protruding with respect to the internal surface of the hollow cylindrical body 10 so as to intercept a portion of fluid flowing inside the hollow cylindrical body 10 and divert it radially inside the passage channels 40 towards the frusto-conical peripheral portions 23, as described below.

The present disclosure also relates to a method for coalescence separation which diverts the fluid comprising at least partially immiscible phases from a longitudinal direction to radial directions with circumferentially distributed flow.

BRIEF DESCRIPTION OF THE DRAWINGS

Further characteristics and advantages of the present disclosure will become clear from the following description of a non-limiting example of an embodiment thereof, with reference to the Figures of the attached drawings, in which:

FIG. 1 is a schematic three-dimensional view of the device with coalescing sheets;

FIGS. 2 and 3 are sections of three-dimensional views of the device with coalescing sheets in which two adjacent coalescing sheets are visible to show in detail the extent of the passage channel with the course of the flow of the fluid, the curved edge for collecting the coalescent phase and the evacuation conduit;

DETAILED DESCRIPTION OF THE DISCLOSURE

Figure 4:
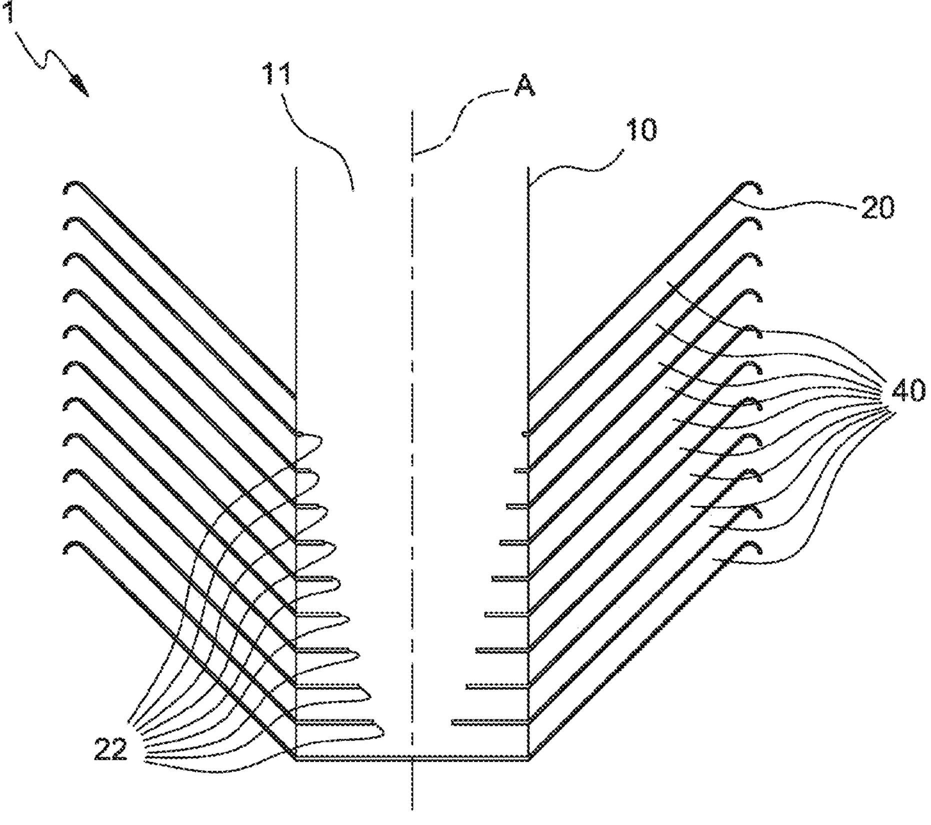
FIG. 4 is a longitudinal section of the device with coalescing sheets showing the arrangement of the various sheets.

With reference to FIGS. 1-4, the present disclosure relates to a coalescing separation device 1 comprising a plurality of axial-symmetrical geometry coalescing sheets 20 with symmetry axis A coinciding with that of a hollow cylindrical body 10. The hollow cylindrical body 10 is provided, at one end, with an opening 11 defining the fluid inlet to the device 1. Each coalescing sheet 20 comprises a circular central plane portion 21 provided with a through opening 22 and a frusto-conical peripheral portion 23 with a major base arranged towards the opening 11 of the cylindrical body. The sheets 20 are arranged parallel to one another and spaced apart from one another to form passage channels 40 for the fluid. Each central plane portion 21 at least partially protrudes with respect to the internal surface of the hollow cylindrical body 10 so as to intercept a portion of fluid flowing inside the hollow cylindrical body 10 conveying it towards the passage channels 40.

The gist of the present disclosure lies in the fact that the portions of fluid intercepted in the hollow cylindrical body 10 by means of the central portions 21 are diverted so as to change the direction of the flow from parallel to the longitudinal axis of the cylindrical body to substantially radial with respect to the same axis. This diversion causes the fluid to move circumferentially away from the axis of the hollow cylindrical body 10; following this first change in direction, the fluid portions undergo a further diversion due to the frusto-conical peripheral portions 23. The variations in the direction of the flow induce accelerations on the immiscible phases contained therein and thus the forces dependent on the physical properties of the different phases, thus inducing a separation also due to inertial effects. In each passage channel 40, a significant slowdown of the portion of fluid passing through it is also achieved since the annular-shaped circumferential passage sections that the fluid subsequently crosses in its radial path towards the outlet of the device 1 are gradually increasing in area. The combination of the inertial effect induced by the diversions imposed on the treated fluid through the passage channels 40 and the slowdown on the radial path of the fluid outlet maximise the effectiveness of the separation and coalescence of the immiscible phases included in the aforesaid fluid. Decreasing the velocity of the fluid increases its residence time, thereby increasing its separation efficiency. In addition, the slowdown of the fluid in the passage channels 40 reduces the risk of entrainment and entrapment of the separate phase (e.g., oil versus water) leading to a much higher overall fluid purification efficiency than that of the prior art systems. The velocity of the fluid at the inlet of each passage channel 40 is less than 1 m/s, preferably is less than 0.5 m/s; the velocity at the outlet of each channel is less than 0.1 m/s, preferably less than 0.05 m/s.

With reference to FIG. 4, in a preferred embodiment of the separation device 1 with coalescing sheets 20 the area of the through opening 22 of the coalescing sheet closest to the opening 11 is the largest compared to the areas of the through openings 22 of the following coalescing sheets 20 which progressively decrease up to the coalescing sheet farthest from the opening 11 which is provided with a zero area opening. The progressive decrease of the areas of the through openings 22 along the longitudinal axis A of the hollow cylindrical body 10 introduces calibrated pressure losses that allow obtaining equal flow rates of diverted fluid at the inlet for each single passage channel 40. In this way, each passage channel 40 receives at the inlet a portion of fluid with a flow rate at the inlet equal to that of the other passage channels 40 ensuring the same separation efficiency and operating constancy for all passage channels 40. This configuration increases the total separation efficiency of the device 1 with coalescing sheets 20.

In a further preferred embodiment of the disclosure of the separation device 1 with coalescing sheets 20, the sheets 20 are arranged parallel to each other in an equidistant manner with a distance between 5 mm and 30 mm, said distance remaining constant along the passage channels 40. The range of distance values identified allows a particularly effective operation of the device 1 with coalescing sheets. Longer distances between the sheets 20 have the effect of slowing down the fluid engaged in the passage channel formed by the aforesaid sheets; the slowing down of the fluid has a beneficial effect for the separation of the phases but, an excessively low velocity can compromise the transport of the coalescent phase droplets that would not be able to reach the outlet of the device 1 in order to be evacuated and collected.

With reference to FIGS. 2 and 3, in a further preferred embodiment of the disclosure of the separation device 1 with coalescing sheets 20, each frusto-conical peripheral portion 23 is provided on the major base circumference 25 with a curved axial-symmetrical profile 50 apt to favour the collecting of the coalescent phase of the fluid, the profile 50 being interrupted by at least one conduit 51 radially arranged and intended to evacuation of the coalescent phase accumulated along the profile 50. The presence of the curved axial-symmetrical profile 50 ensures a zone of accumulation of the coalescent phase droplets that favours both further aggregation and channeled disposal.

Figure 9:
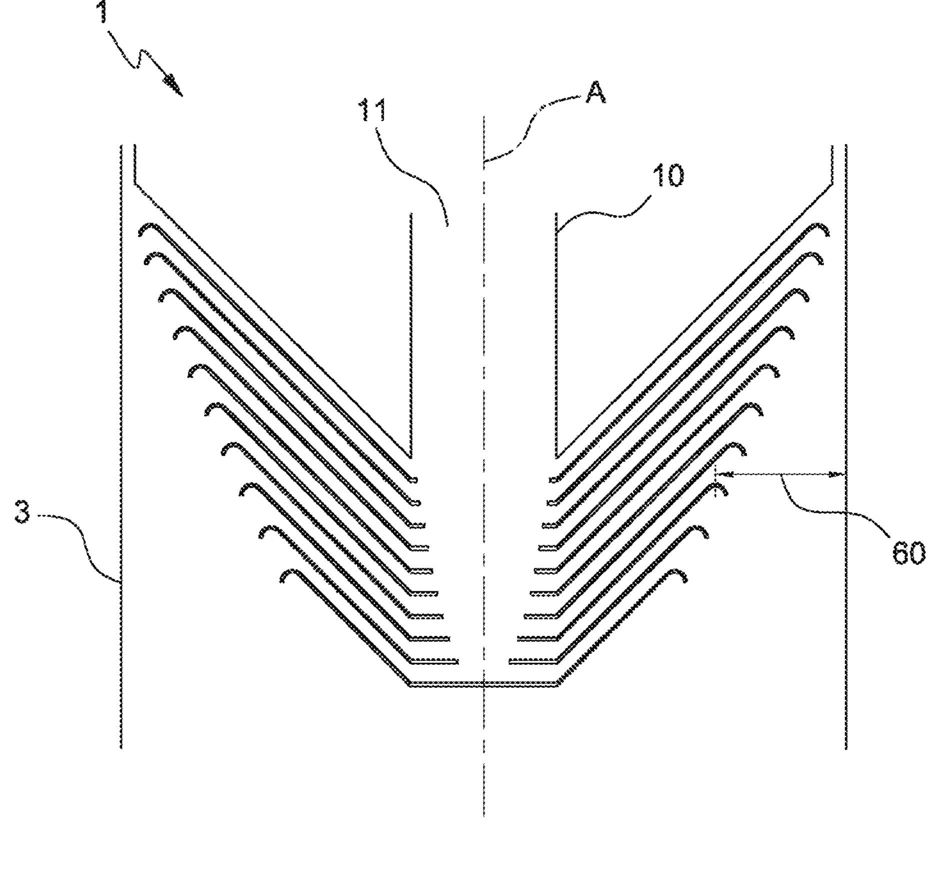
FIG. 9 is a longitudinal section of the device with coalescing sheets engaged in a discharge conduit.

In the case where the separation device 1, as shown in FIG. 9, is installed inside a pipe 3 and therefore the outlet of the fluid flow rate treated by the separation device 1 takes place inside said pipe, the distance 60 between the major base circumference 25 of the frusto-conical peripheral portions 23 and the internal surface of the pipe 3 is of particular importance. In fact, since the flow rate of fluid exiting from each passage channel 40 of the device 1 is added to the flow rates exiting from the previous passage channels 40, there is a risk that the distance 60, between the major base circumference 25 of the frusto-conical peripheral portion 23 and the internal surface of the pipe 3, is not sufficient for configuring an area passage section such as not to create counterpressure to the discharge of the separation device 1. To overcome this potential problem, in a further preferred embodiment of the separation device 1 with coalescing sheets 20 as previously described the diameter of the major base circumference 25 of the frusto-conical peripheral portion 23 of the coalescing sheet closest to the opening 11 is the largest compared to the major base circumferences 25 of the following frusto-conical peripheral portions 23 which progressively decrease up to the coalescing sheet farthest from the opening 11. This configuration allows the progressive increase of the distance 60 between the major base circumference 25 of the frusto-conical peripheral portion 23 and the internal surface of the pipe 3 along the axis of the pipe 3, which results in a progressive increase of the available passage area between the separation device 1 and the internal surface of the pipe 3 reducing the pressure drops of the fluid exiting the separation device 1. This geometry with frusto-conical peripheral portions 23 which are tapered on the diameters of the major base circumferences 25 allows the discharge into a pipe 3 of the treated fluid flow rate without significant impacts on the separation efficiency.

Figures 5, 6, 7:
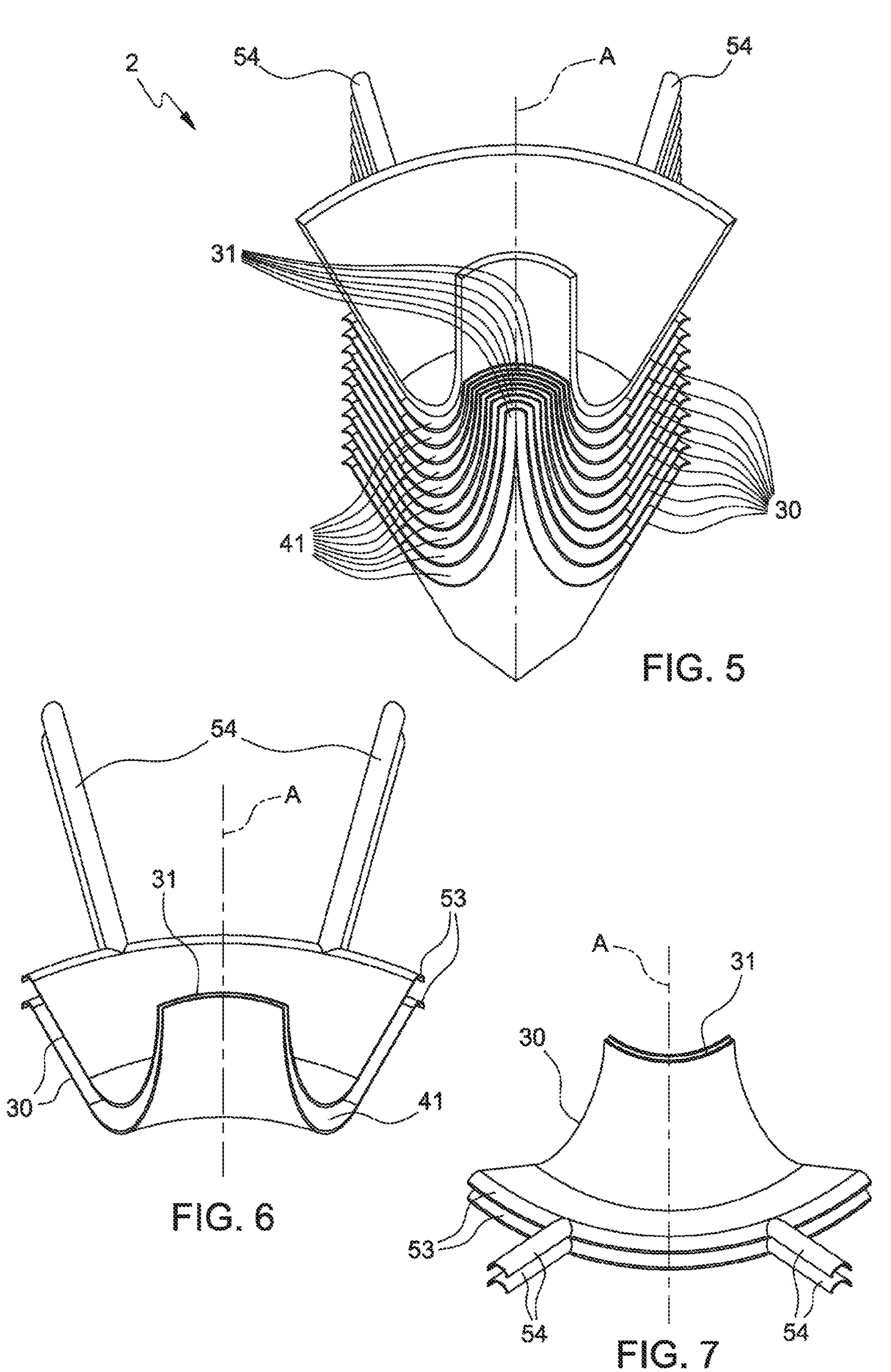
FIG. 5 is a schematic three-dimensional view portion of the device with "J" trays.
FIGS. 6 and 7 are sections of three-dimensional views of the device with "J" trays in which two contiguous coalescing membranes are visible to show in detail the extent of the passage channel with the course of the flow of the fluid, the curved edge for collecting the coalescent phase and of the evacuation conduit.

With reference to FIG. 5, the disclosure also relates to an alternative coalescence separation device 2 for a fluid comprising at least two phases at least partially immiscible with each other and having different specific density or gravity, the separation device 2 comprising a plurality of axial-symmetrical trays 30 concentrically arranged and generated by plane curves having a substantially elongated "J" shape and spaced apart from one another so as to form passage channels 41 between the trays themselves, the passage channels 41 forming concentric inlet mouths 31 having a circular crown section and intercepting the incoming flow of fluid, having a direction parallel to the symmetry axis of the axial-symmetrical trays 30, and convey it towards exits with prevalently radial direction component of the flow of fluid. The separation device 2 is linked to the separation device 1 described above by the same inventive concept of diversion of the flow of the fluid to be treated from a direction prevalently parallel to the symmetry axis A to one with a radial flow direction component. The separation device 2 is therefore an alternative embodiment of the same disclosure. The separation device 2 with axial-symmetrical trays 30 makes more efficient use of the inertial effect acting on the fluid thanks to the conformation of the passage channels 41; the almost total inversion of the flow direction occurring in the central part of the elongated J-section channels drastically increases the inertial separation effect on the treated fluid. Furthermore, the redirection of the fluid in the various channels making it assume a direction with radial component at the exit allows a further slowdown of the fluid itself since the annular-shaped circumferential passage sections that the fluid subsequently crosses in its radial path towards the outlet of the device 2 are gradually increasing in area. The combination of the inertial effect induced by the diversions imposed on the treated fluid through the passage channels 41 and the slowdown on the radial path of the fluid outlet maximise the effectiveness of the separation and coalescence of the immiscible phases included in the aforesaid fluid. Decreasing the velocity of the fluid increases its residence time, thereby increasing its separation efficiency. In addition, the slowdown of the fluid in the passage channels 41 reduces the risk of entrainment and entrapment of the separate phase (e.g., oil versus water) leading to a much higher overall fluid purification efficiency than that of the prior art systems.

Figure 8:
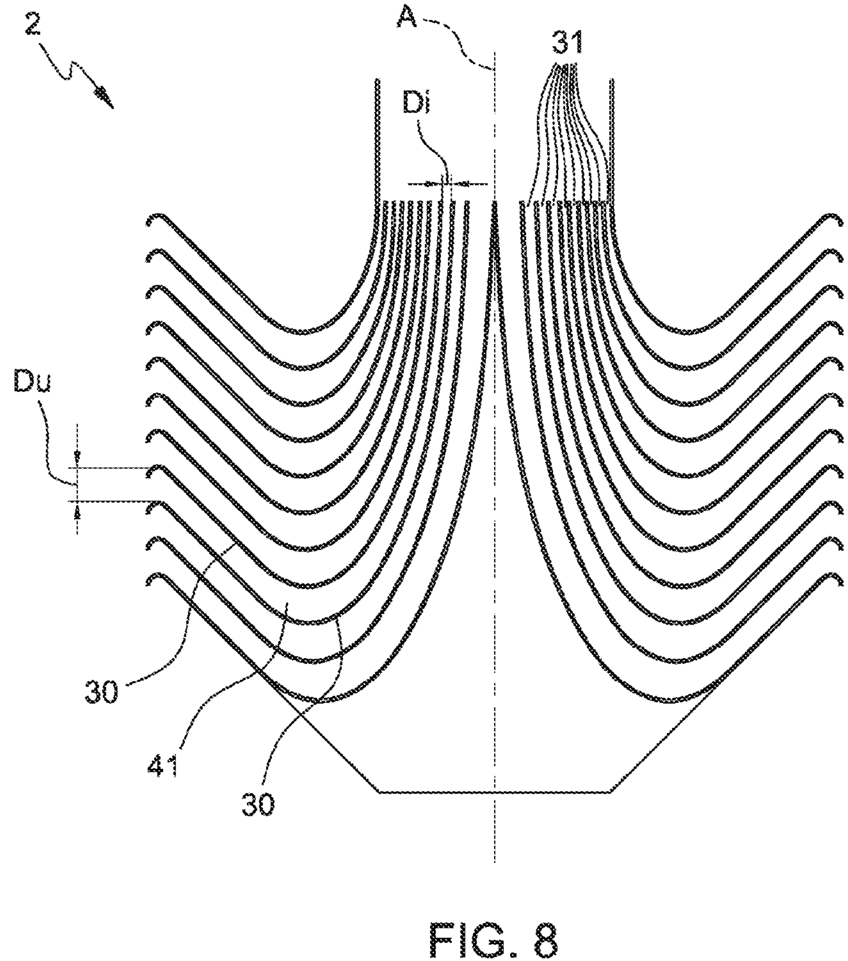
FIG. 8 is a longitudinal section of the device with "J" membranes showing the arrangement of the various membranes.

With reference to FIG. 8, in a preferred embodiment of the separation device 2 with axial-symmetrical trays 30 as described above, each circular crown of each inlet mouth 31 is characterized by a difference between the major radius and the minor radius different from that of the other circular crowns so as to form passage sections that ensure a flow rate of fluid substantially constant in all the concentric inlet mouths 31. In particular, the concentric mouth with a circular crown having a larger outer diameter will have a difference between the major radius and the minor radius that is smaller than the difference between the major radius and the minor radius of the other mouths, this difference progressively increasing according to the decrease of their major radius. As evident from FIG. 8, in a preferred embodiment of the separation device 2 as previously described, each passage channel 41 is characterized by having a longitudinal section in which the inlet distance Di between two adjoining axial-symmetrical trays 30 that define it at the inlet of the channel 41 is smaller than the exit distance Du of the same membranes at the outlet of the channel 41, generating a diverging section which increases the passage area of the fluid passing through the channel 41 reducing the exit radial velocity thereof. The divergent course of the passage channel 41 introduces an additional element slowing down the fluid passing through the channel, maximising the process for coalescence separation.

With reference to FIGS. 6 and 7, in a preferred embodiment of the separation device 2 with axial-symmetrical trays 30 as previously described each axial-symmetrical tray 30 is provided on the fluid exit edge with a curved axial-symmetrical profile 53 apt to favour the collecting of the coalescent phase of the fluid, the profile 53 being interrupted by at least one conduit 54 radially arranged and intended to evacuation of the coalescent phase accumulated along the curved axial-symmetrical profile 53. The presence of the curved axial-symmetrical profile 53 allows coalescent phase droplets to be collected and conveyed to one or more conduits 54 for evacuation.

Preferably, the discharge conduits 51 for the separation device 1 with coalescing sheets 20 and 54 for the separation device 2 with axial-symmetrical trays 30 are arranged circumferentially with an angular distance of 45 degrees from one another to increase the evacuation capacity of the coalescent phase.

The present disclosure further relates to a method for coalescence separation of a fluid comprising at least two phases at least partially immiscible with each other and having different specific density or gravity, the method comprising the steps of:

intercepting the fluid that moves in a longitudinally extending conduit by using a separation device 1, 2;

diverting the fluid so as the longitudinal velocity thereof in the conduit at the inlet of the device 1, 2 converts in radial velocity with respect to the same conduit at the outlet of the same separation device;

slowing down the fluid between the inlet and the outlet of the device 1, 2 by means of passage channels 40, 41 with passage area increasing along the extent of the channels;

separating the phases at least partially immiscible with each other and having different specific density or gravity.

The method according to the present disclosure, by redirecting the fluid through the passage channels that extend radially with respect to the incoming fluid flow, allows an important slowdown of the fluid itself facilitates coalescence separation.

The method for coalescence separation of the present disclosure, in a preferred configuration implements the step of intercepting the fluid by dividing the flow of the fluid at the inlet of the separation device 1, 2 in equal flow rates in each passage channel 40, 41.

Dividing the total flow rate of the fluid to be treated in equivalent flow rates for each passage channel 40, 41 of the separation device 1, 2 maximises the separation efficiency. The materials of manufacture of the separation device 1, 2 can be metallic materials, plastics or composite materials. The geometry of the separation devices 1 and 2 also lends itself to manufacture by 3D printing, ensuring ease of realization and reducing the difficulties of supply and shipping the devices to the field.

Two prototypes were built during the experimentation and research phase carried out for the separation devices 1, 2. Both the prototype of separation device 1 with coalescing sheets and the separation device 2 with axial-symmetrical "J" trays were dimensioned with a maximum diameter of 400 mm and a maximum height of 50 mm; 10 sheets or trays spaced 10 mm apart and 1 mm thick were provided. The separation devices 1, 2 have been designed to be inserted into a pipe with a diameter of 500 mm. The treatment capacity of the separation devices 1, 2 tested in the laboratory is 1000 barrels/day but their treatment capacity can be easily scaled up by adjusting the basic dimensioning parameters such as diameter, number of sheets/membranes and their spacing.

The separation device 1, 2 of the present disclosure thus conceived is in any case susceptible to many modifications and variants, all falling within the same inventive concept; furthermore, all the details can be replaced by technically equivalent elements. In practice, the materials used can be of any type according to the technical requirements.

The protective scope of the disclosure is therefore defined by the appended claims.

The invention claimed is:

1. A coalescence separation device for a fluid comprising at least two phases at least partially immiscible with each other and having different specific density or gravity, the device comprising:

- a hollow cylindrical body having a longitudinally axis (A), vertical in use, and provided, at one end, with an opening defining a fluid inlet from above;
- a plurality of axial-symmetrical geometry coalescing sheets with an axis coinciding with the longitudinally axis (A) of the hollow cylindrical body, each of the coalescing sheets comprising a circular central plane portion provided with a through opening and a frusto-conical peripheral portion arranged so that the distance from the opening of the hollow cylindrical body of a plane containing a major base of the frusto-conical peripheral portion is smaller than the distance from the opening of the hollow cylindrical body of a plane containing a minor base of the frusto-conical peripheral portion, the distances being measured along the axis (A) of the hollow cylindrical body, the minor base coinciding with the periphery of the central portion;

the coalescing sheets being arranged parallel to one another and spaced apart from one another to form passage channels for the fluid, the central plane portion of each coalescing sheet being at least partially protruding with respect to an internal surface of the hollow cylindrical body so as to intercept a portion of fluid flowing inside the hollow cylindrical body and divert it radially inside the passage channels towards the frusto-conical peripheral portions.

2. The coalescence separation device according to claim 1, wherein the area of the through opening of the coalescing sheet closest to the opening of the hollow cylindrical body is the largest compared to areas of the through openings following coalescing sheets which progressively decrease up to the coalescing sheet farthest from the opening of the hollow cylindrical body that is provided with an opening of null area.

3. The coalescence separation device according to claim 1, wherein the coalescing sheets are arranged parallel to one another and equidistant from one another.

4. The coalescence separation device according to claim 3, wherein the distance between the coalescing sheets is between 5 mm and 30 mm, and wherein the distance remains constant along the passage channels.

5. The coalescence separation device according to claim 1, wherein each frusto-conical peripheral portions is provided on a major base circumference with a curved axial-symmetrical profile apt to favour collection of a coalescent phase of the fluid, and wherein the profile is interrupted by at least one conduit radially arranged and intended for evacuation of the coalescent phase accumulated along the profile.

6. The coalescence separation device according to claim 1, wherein the diameter of a major base circumference of the frusto-conical peripheral portions of the coalescing sheet closest to the opening of the hollow cylindrical body is the largest compared to the diameters of the major base circumferences of the following frusto-conical peripheral portions which progressively decrease up to the coalescing sheet farthest from the opening of the hollow cylindrical body.

7. A coalescence separation device for a fluid having at least two phases at least partially immiscible with each other and having different specific density or gravity, the device comprising a plurality of axial-symmetrical trays concentrically arranged and generated by plane curves having a substantially elongated "J" shape and spaced apart from one another so as to form passage channels between the strays, the passage channels forming concentric inlet mouths having a circular crown section and intercepting an incoming flow of fluid at an inlet of the separation device, having a direction parallel to the symmetry axis of the axial-symmetrical trays, and conveys the incoming flow of fluid towards exits with prevalently radial direction component of a flow of fluid.

8. The coalescence separation device according to claim 7, wherein each circular crown of each inlet mouth has a difference between a major radius and a minor radius different from that of the other circular crowns so as to form passage sections that ensure a flow rate of fluid substantially constant in all the inlet mouths.

9. The coalescence separation device according to claim 7, wherein each passage channel has a longitudinal section in which an inlet distance (Di) between two adjoining axial-symmetrical trays defined at the inlet of the channel is smaller than an exit distance (Du) of the same strays at the exit of the channel generating a diverging section which increases the passage area of the fluid passing through the channel reducing an exit radial velocity thereof.

10. The coalescence separation device according to claim 7, wherein each axial-symmetrical tray is provided on a fluid exit edge with a curved axial-symmetrical profile for collecting of a coalescent phase of the fluid, the curved axial-symmetrical profile being interrupted by at least one conduit radially arranged and intended for evacuation of the coalescent phase accumulated along the curved axial-symmetrical profile.

11. A method for coalescence separation of a fluid comprising at least two phases at least partially immiscible with each other and having different specific density or gravity, the method comprising the steps of:

intercepting the fluid that moves in a longitudinally extending conduit by using a separation device according to claim 1;

diverting the fluid so as a longitudinal velocity thereof in the conduit at the inlet of the separation device converts in radial velocity with respect to the same conduit at an exit of the same separation device;

slowing down the fluid between an inlet and an outlet of the separation device by means of the passage channels with passage area increasing along the extent of the said channels;

separating the phases at least partially immiscible with each other and having different specific density or gravity.

12. The method according to claim 11, wherein the step of intercepting the fluid is carried out by dividing the flow of the fluid at the inlet of the separation device in equal flow rates in each passage channel.

* * * * *